US012109632B2

(12) United States Patent
Hecht

(10) Patent No.: US 12,109,632 B2
(45) Date of Patent: Oct. 8, 2024

(54) TOOL HOLDER WITH UPPER AND LOWER JAWS DEFINING AN INSERT RECEIVING POCKET AND CUTTING TOOL

(71) Applicant: ISCAR, LTD., Tefen (IL)

(72) Inventor: Gil Hecht, Nahariya (IL)

(73) Assignee: ISCAR, LTD., Tefen (IL)

( * ) Notice: Subject to any disclaimer, the term of this patent is extended or adjusted under 35 U.S.C. 154(b) by 0 days.

(21) Appl. No.: 17/481,359

(22) Filed: Sep. 22, 2021

(65) Prior Publication Data
US 2023/0092953 A1    Mar. 23, 2023

(51) Int. Cl.
*B23B 27/08* (2006.01)
*B23B 29/04* (2006.01)

(52) U.S. Cl.
CPC .......... *B23B 29/043* (2013.01); *B23B 27/086* (2013.01); *B23B 2205/02* (2013.01); *B23B 2260/02* (2013.01)

(58) Field of Classification Search
CPC ..... B23B 27/086; B23B 27/083; B23B 27/08; B23B 27/04; B23B 27/045; B23B 2205/02; B23B 29/043; B23B 2210/022; B23B 2220/12; B23B 2260/02
See application file for complete search history.

(56) References Cited

U.S. PATENT DOCUMENTS

| 2,341,659 A | * | 2/1944 | Schillberg | B23B 27/086 407/102 |
| 2,371,715 A | * | 3/1945 | Smith | B23B 27/086 407/107 |
| 2,674,781 A | * | 4/1954 | Smith | B23B 27/086 407/107 |
| 3,205,558 A | * | 9/1965 | Stier | B23B 27/04 407/112 |

(Continued)

FOREIGN PATENT DOCUMENTS

| AT | 7664 U1 | * | 7/2005 | |
| CH | 685680 A5 | * | 9/1995 | ............. B23B 27/04 |

(Continued)

OTHER PUBLICATIONS

International Search Report dated Dec. 7, 2022, issued in PCT counterpart application No. PCT/IL2022/050936.

(Continued)

*Primary Examiner* — Ryan Rufo
(74) *Attorney, Agent, or Firm* — Womble Bond Dickinson (US) LLP

(57) ABSTRACT

A tool holder having a holder body, an opening of the holder body having opposing upper and lower jaws respectively defining upper and lower pocket surfaces of an insert receiving pocket, and a resilience slot extending away from the insert receiving pocket. A first plane intersects the upper and lower pocket surfaces, and an actuating member extends from the upper jaw along a first axis in a downward direction (Continued)

and traverses the resilience slot. The lower jaw includes an access bore, and a locking member occupies the access bore and engages a locking portion of the actuating member. The upper jaw has a top jaw surface facing in an upward direction, and the first axis intersects the top jaw surface. A cutting tool is configured with the tool holder and a cutting insert removably secured in the insert receiving pocket.

30 Claims, 8 Drawing Sheets

(56) References Cited

U.S. PATENT DOCUMENTS

| | | | | |
|---|---|---|---|---|
| 3,455,001 A * | 7/1969 | Sirola | ................. | B23B 27/04 407/111 |
| 3,500,522 A * | 3/1970 | Stier | .................. | B23B 27/04 407/111 |
| 5,207,537 A * | 5/1993 | Englund | ............. | B23B 29/043 407/50 |
| 5,267,817 A * | 12/1993 | Englund | ............. | B23B 29/043 407/117 |
| 5,516,241 A * | 5/1996 | Plutschuck | ........... | B23B 27/04 407/110 |
| 5,820,309 A * | 10/1998 | Mihic | ................ | B23D 61/025 407/50 |
| 5,934,843 A * | 8/1999 | Brask | ................. | B23B 27/04 407/108 |
| 6,139,227 A | 10/2000 | Schafer et al. | | |
| 6,244,780 B1 * | 6/2001 | Hansson | ............. | B23B 29/046 409/234 |
| 6,814,526 B2 | 11/2004 | Shiraiwa et al. | | |
| 7,246,974 B2 * | 7/2007 | Hansson | ............. | B23B 27/04 409/107 |
| 7,578,640 B2 * | 8/2009 | Hecht | ................ | B23B 29/043 407/103 |
| 8,079,785 B2 * | 12/2011 | Nicholas | ........... | B23B 29/043 407/101 |
| 8,491,232 B2 * | 7/2013 | Schaefer | ........... | B23B 29/14 407/117 |
| 8,696,259 B2 * | 4/2014 | Hecht | ................ | B23B 27/10 407/101 |
| 8,701,537 B2 * | 4/2014 | Baernthaler | ........ | B23B 27/045 83/843 |
| 8,740,511 B2 | 6/2014 | Hecht | | |
| 9,475,122 B2 * | 10/2016 | Andersson | .......... | B23B 27/045 |
| 9,511,431 B2 * | 12/2016 | Baernthaler | ........ | B23D 61/06 |
| 10,010,942 B2 * | 7/2018 | Athad | ................ | B23B 27/045 |
| 10,556,272 B2 * | 2/2020 | Noureddine | .......... | B23B 27/04 |
| 2011/0303070 A1 | 12/2011 | Baernthaler et al. | | |
| 2014/0321926 A1 | 10/2014 | Sadikov et al. | | |
| 2021/0220921 A1 * | 7/2021 | Luik | ................... | B23B 29/043 |

FOREIGN PATENT DOCUMENTS

| | | | | |
|---|---|---|---|---|
| DE | 3301919 | A1 * | 7/1984 | |
| DE | 19623081 | C1 * | 1/1998 | ............. B23C 5/08 |
| EP | 3939723 | A1 * | 1/2022 | |
| SU | 1284716 | A1 * | 1/1987 | |

OTHER PUBLICATIONS

Written Opinion dated Dec. 7, 2022, issued in PCT counterpart application No. PCT/IL2022/050936.

* cited by examiner

TOOL HOLDER WITH UPPER AND LOWER JAWS DEFINING AN INSERT RECEIVING POCKET AND CUTTING TOOL

FIELD OF THE INVENTION

The present invention relates to a tool holder with upper and lower jaws defining an insert receiving pocket, for use in metal cutting processes in general, and for grooving, parting and slotting operations in particular.

BACKGROUND OF THE INVENTION

Within the field of cutting tools used in grooving, parting, and slotting operations, there are many examples of tool holders with upper and lower jaws defining an insert receiving pocket, and in some examples, one of the upper and lower jaws is resiliently displaceable with respect to the other.

U.S. Pat. No. 6,139,227 discloses a holder for free-cutting machining tool inserts, especially for chiseling, piercing or cutting inserts, including an essentially beam-like edge support with a receiving pocket constructed in its end for the blade edge inserts. Clamping jaws define the narrow width of the receiving pocket. A slot is configured in the blade edge support forming a flexible pivot for moving one clamping jaw. An operating member is provided for producing a clamping force in the area of the slot on the movable clamping jaw. The operating member is mounted in a bore at some distance from the slot. The clamping force is transmitted to the movable clamping jaw through a force transmission member which is slidably guided in the blade edge support.

U.S. Pat. No. 6,814,526 discloses a holder designed to receive a cutting insert intended for parting and grooving operations. The insert is clampable in a seat formed between a blade tongue and a clamping finger which respectively extend from lower and upper front parts of the holder. A gap separates those front parts in order to enable those parts to be forced towards each other by means of a clamping mechanism mounted in the holder. The clamping mechanism comprises a drawbar, a first end portion of which is movable within a bore formed in one of the front parts, and a second end portion of which is fixed in the other front part. The first end portion of the drawbar includes a head having a frusto-conical abutment surface. A tightening screw is threadedly mounted in the same front part as the head and is arranged to contact the abutment surface to displace the drawbar in a direction forcing the clamping finger and the tongue together to clamp the cutting insert in place.

U.S. Pat. No. 8,740,511 discloses a tool holder comprising a main body having a holder head extending away from a holder shank in a forward direction, a clamping member non-threadingly retained in the holder head, and a locking member operatively engaging a single abutment surface of the clamping member. The holder head has an insert receiving pocket at a forward end thereof with a pocket support surface substantially facing in an upward direction, and the clamping member is located entirely rearward of the pocket support surface with the abutment surface facing generally upwardly. The tool holder is configured to direct a clamping force towards, and clamp a cutting insert against, the pocket support surface.

It is an object of the present invention to provide an improved tool holder having upper and lower jaws, one of which is resiliently displaceable with respect to the other.

It is also an object of the present invention to provide an improved tool holder with a reduced number of assembly steps, a reduced risk of inadvertent falling parts, and reduced manufacturing costs.

It is a further object of the present invention to provide an improved tool holder having coolant ducts routed through the upper and lower jaws.

It is yet a further object of the present invention to provide an improved cutting tool having a cutting depth not limited by the tool holder.

SUMMARY OF THE INVENTION

In accordance with the present invention, there is provided a tool holder comprising a holder body having opposing upper and lower jaws respectively defining upper and lower pocket surfaces of an insert receiving pocket, one of the upper and lower jaws being resiliently displaceable with respect to the other, a resilience slot extending away from the insert receiving pocket and further separating the upper and lower jaws, and a first plane intersecting the upper and lower pocket surfaces, wherein:

an actuating member extends from the upper jaw along a first axis in a downward direction and traverses the resilience slot, the actuating member having a locking portion, an access bore formed in the lower jaw extends along a second axis, and a locking member extending along a third axis occupies the access bore and engages the locking portion of the actuating member, and wherein:

the upper jaw has a top jaw surface facing in an upward direction opposite to the downward direction, and the first axis intersects the top jaw surface.

Also, in accordance with the present invention, there is provided a cutting tool having a tool holder of the sort described above, and a cutting insert removably secured in the tool holder's insert receiving pocket.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
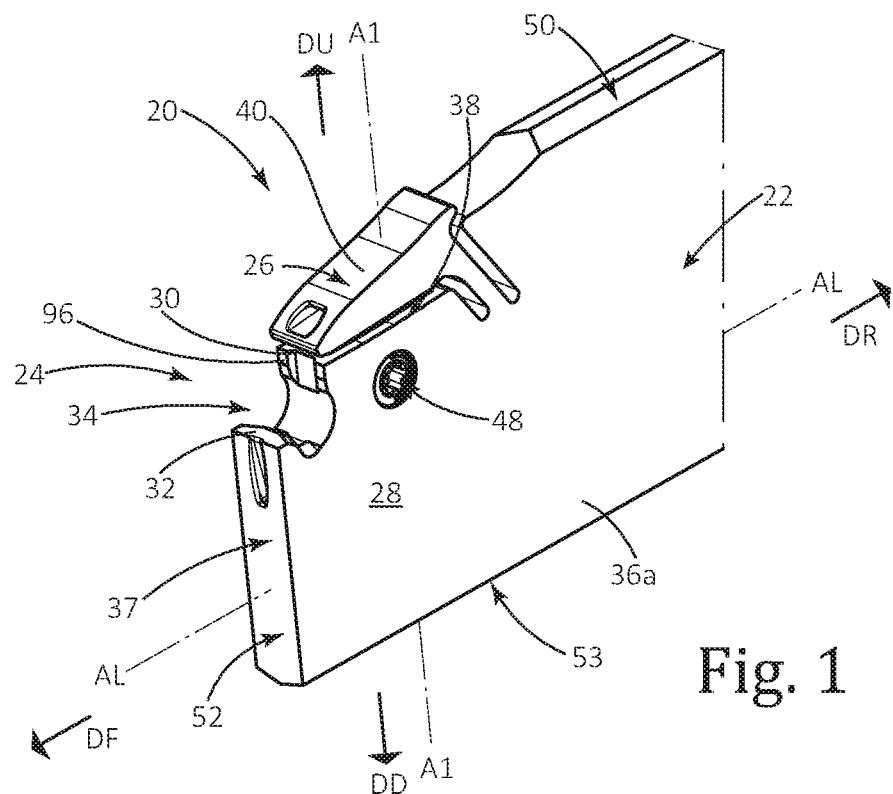
FIG. 1 is a perspective view of a tool holder in accordance with some embodiments of the present invention.

Attention is first drawn to 1 to 4, showing a tool holder 20 according to the present invention, comprising a holder body 22 having opposing upper and lower jaws 26, 28 respectively defining upper and lower pocket surfaces 30, 32 of an insert receiving pocket 34, and one of the upper and lower jaws 26, 28 being resiliently displaceable with respect to the other.

In some embodiments of the present invention, the tool holder 20 may preferably be manufactured from tool steel.

Also, in some embodiments of the present invention, the upper and lower jaws 26, 28 may be integrally formed, having unitary one-piece construction (i.e., having "monolithic" construction).

Further, in some embodiments of the present invention, the insert receiving pocket 34 may be formed in an opening 24 in the holder body 22.

Yet further, in some embodiments of the present invention, the lower jaw 28 may be fixed or static with respect to much of the holder body 22 and the upper jaw 26 may be resiliently replaceable with respect to the lower jaw 28.

Figure 4:
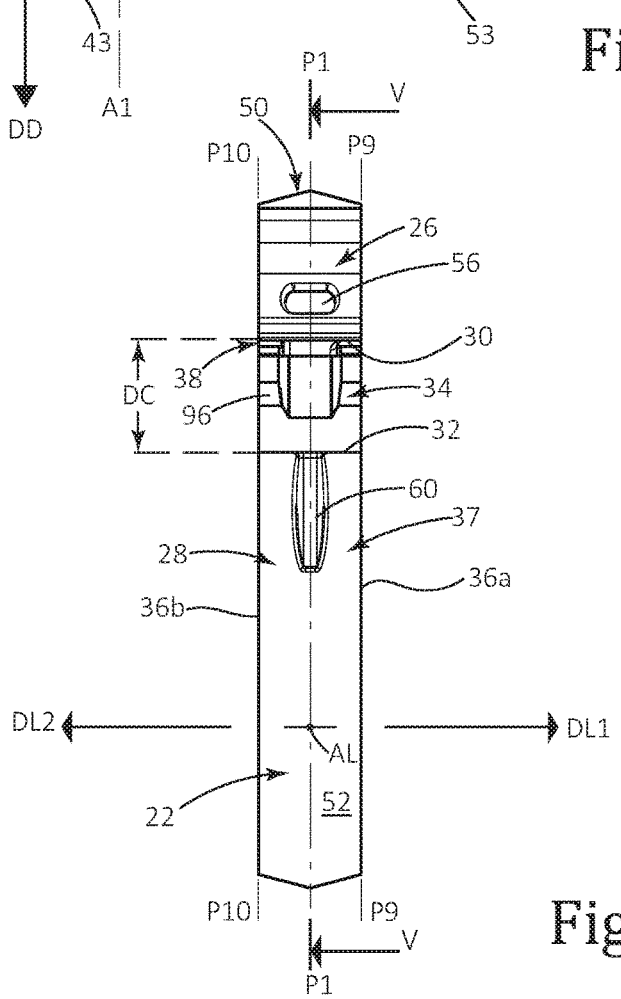
FIG. 4 is an end view of the tool holder shown in FIG. 1.

As shown in FIG. 4, the holder body 22 may have opposing first and second body side surfaces 36a, 36b facing away from each other.

Figure 3:
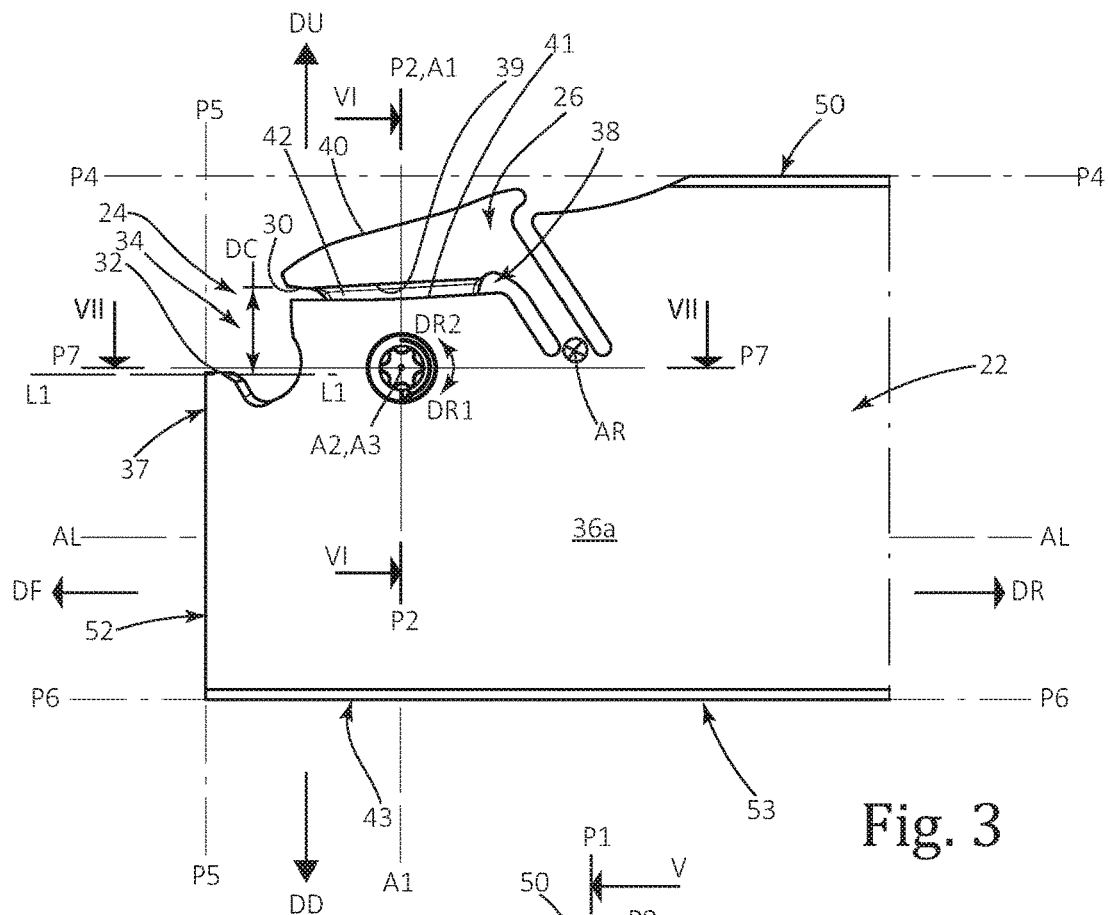
FIG. 3 is a side view of the tool holder shown in FIG. 1.

In some embodiments of the present invention, as shown in FIG. 3, the holder body 22 may extend in a rearward-to-forward direction DR, DF.

Also, in some embodiments of the present invention, as shown in FIG. 3, the holder body 22 may be elongated and extend in the rearward-to-forward direction DR, DF along a longitudinal axis AL.

Further, in some embodiments of the present invention, the insert receiving pocket 34 may be located at a forward end 37 of the holder body 22.

Figure 16:
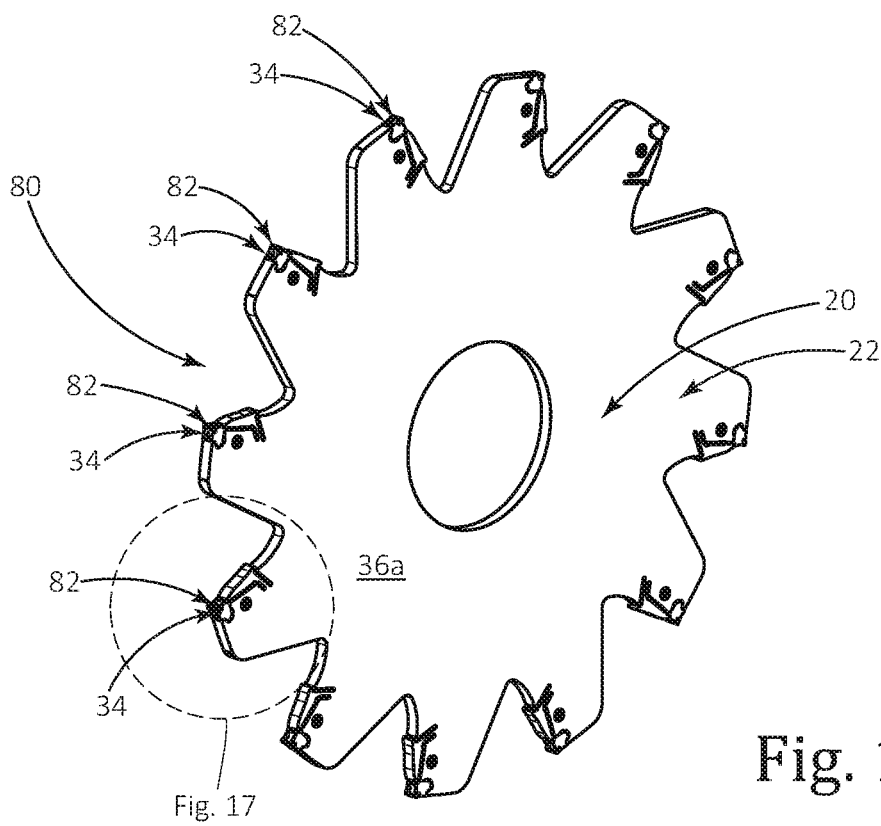
FIG. 16 is a perspective view of a cutting tool in accordance with further embodiments of the present invention.
Figure 17:
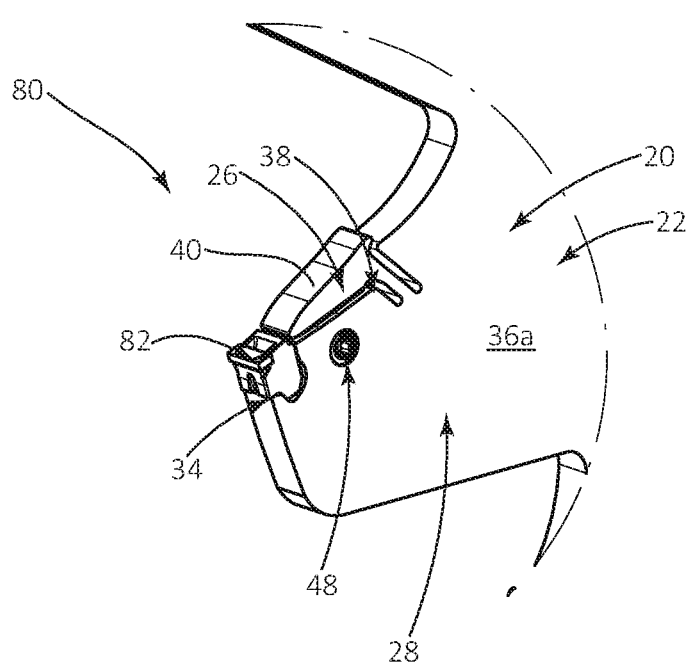
FIG. 17 is a detailed view of the cutting tool shown in FIG. 16.

In further embodiments of the present invention, as shown in FIGS. 16 and 17, the holder body 22 may be disc-shaped, having a plurality of insert receiving pockets 34 circumferentially spaced about the periphery thereof.

For such embodiments of the present invention, it should be appreciated throughout the specification and claims that the term 'rearward' or 'rearward direction' may signify a radially inward direction of the disc-shaped holder body, and the term 'forward' or 'forward direction' may signify a radially outward direction of the disc-shaped holder body.

As shown in FIG. 3, the upper and lower pocket surfaces 30, 32 are spaced apart by a clamping distance DC.

In some embodiments of the present invention, the clamping distance DC may be the shortest distance between a forwardmost portion of the upper pocket surface 30 and the lower pocket surface 32 or a first imaginary straight line L1 tangential thereto, in a side view of the tool holder 20.

Also, in some embodiments of the present invention, the lower pocket surface 32 may be a support surface and the upper pocket surface 30 may be a clamping surface.

As shown in FIG. 3, a resilience slot 38 extends away from the insert receiving pocket 34 and further separates the upper and lower jaws 26, 28.

In some embodiments of the present invention, the resilience slot 38 may extend away from the insert receiving pocket 34 in the rearward direction DR.

Also, in some embodiments of the present invention, as shown in FIG. 3, the upper jaw 26 may have a resilience axis of rotation AR passing through the holder body 22 rearward of the resilience slot 38.

As shown in FIGS. 3 to 6, an actuating member 42 (also referred to as an 'actuator 42') extends from the upper jaw 26 along a first axis A1 in a downward direction DD and traverses the resilience slot 38.

In some embodiments of the present invention, the downward direction DD may be transverse to the longitudinal axis AL.

Also, as shown in FIGS. 3 to 6, the upper jaw 26 has a top jaw surface 40 facing in an upward direction DU opposite to the downward direction DD, and the first axis A1 intersects the top jaw surface 40.

Although FIGS. 3 to 6 depict the upward direction DU as being directly opposite to the downward direction DD, it should be appreciated throughout the description and claims, that the upward direction DU may be generally opposite to the downward direction DD.

It should also be appreciated throughout the description and claims, that as well as intersecting the top jaw surface 40, the first axis A1 passes through the actuating member 42 along its length in the upward-to-downward direction DU, DD.

Figure 6:
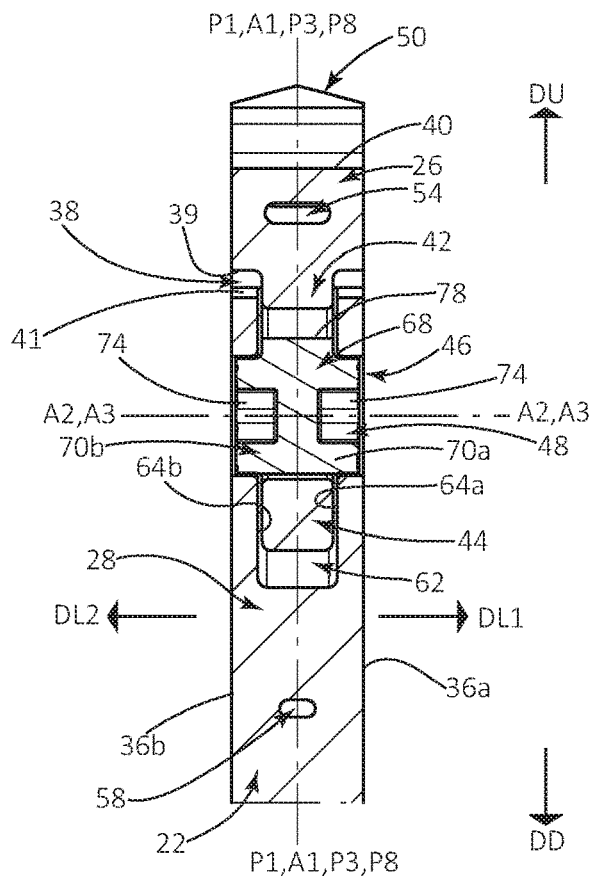
FIG. 6 is a cross-sectional view of the tool holder shown in FIG. 3, taken along the line VI-VI.

In some embodiments of the present invention, as shown in FIG. 6, the actuating member 42 may be elongated in the upward-to-downward direction DU, DD.

Configuring the actuating member 42 such that its first axis A1 intersects the top jaw surface 40 is in contrast to equivalent elements of the prior art publications U.S. Pat. Nos. 6,814,526 and 8,740,511, mentioned above, whereby U.S. Pat. No. 6,814,526 discloses a drawbar extending coaxially with a hole in the upper jaw or upper front part, which opens out to the top surface thereof, and U.S. Pat. No. 8,740,511 discloses a clamping member extending coaxially with a through bore which passes through the upper jaw or clamping jaw, and opens out to the holder head's top surface.

As shown in FIGS. 3 and 4, the resilience slot 38 may be at least partially defined by opposing upper and lower slot surfaces 39, 41 disposed on the upper and lower jaws 26, 28, respectively.

In some embodiments of the present invention, the upper slot surface 39 may face in the downward direction DD and the lower slot surface 41 may face in the upward direction DU.

Also, in some embodiments of the present invention, the actuating member 42 may extend downwardly from the upper slot surface 39.

Further, in some embodiments of the present invention, the upper jaw 26 and the actuating member 42 may be integrally formed, having unitary one-piece construction (i.e., having "monolithic" construction).

Benefits of simultaneously producing the upper jaw 26 and the actuating member 42 to have unitary one-piece construction include: omission of assembly steps and avoidance of inadvertent falling parts.

Yet further, in some embodiments of the present invention, the holder body 22 may be produced by means of additive manufacturing, whereby the upper and lower jaws 26, 28 and the actuating member 42 may be formed simultaneously during the additive manufacturing process.

Benefits of simultaneously producing the upper and lower jaws 26, 28 and the actuating member 42 include: omission of assembly steps and reduction of manufacturing costs.

As shown in FIGS. 3 and 4, the lower jaw 28 may have a bottom jaw surface 43 facing in the downward direction DD, and for such embodiments of the present invention the first axis A1 may intersect the bottom jaw surface 43.

Figure 5:
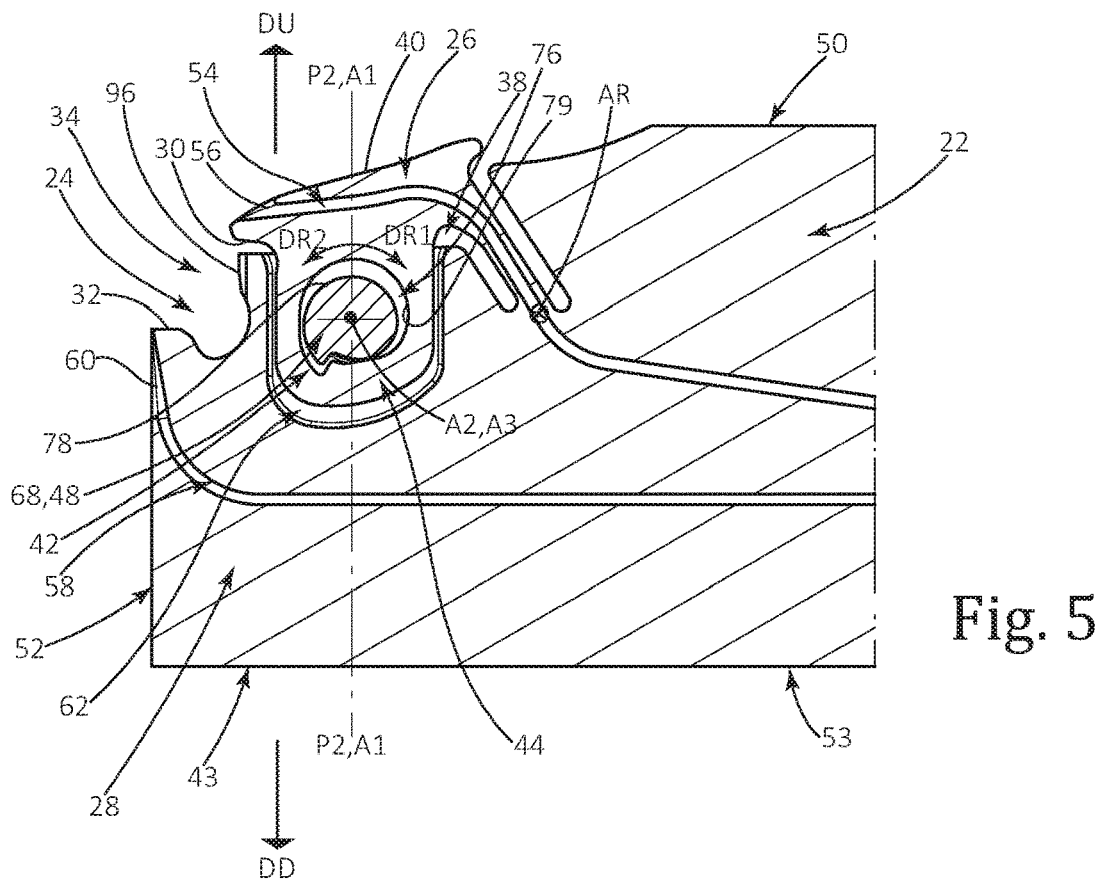
FIG. 5 is a cross-sectional view of the tool holder shown in FIG. 4, taken along the line V-V.
Figure 7:
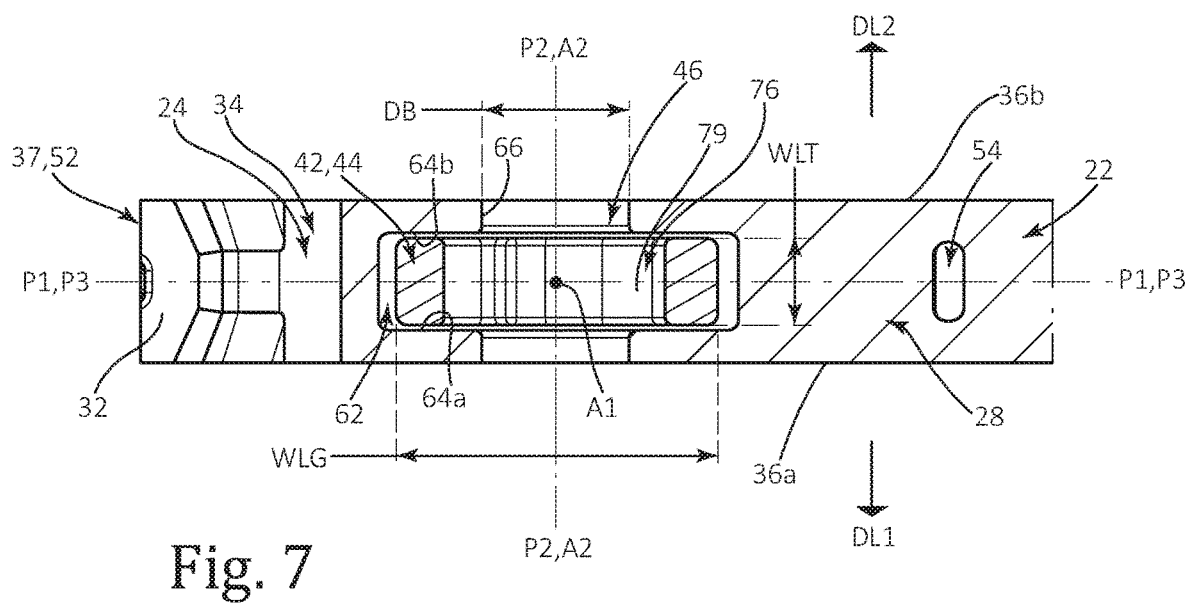
FIG. 7 is a cross-sectional view of the tool holder shown in FIG. 3, taken along the line VII-VII, without its locking member.

As shown in FIGS. 5 to 7, the actuating member 42 includes a locking portion 44.

Figure 2:
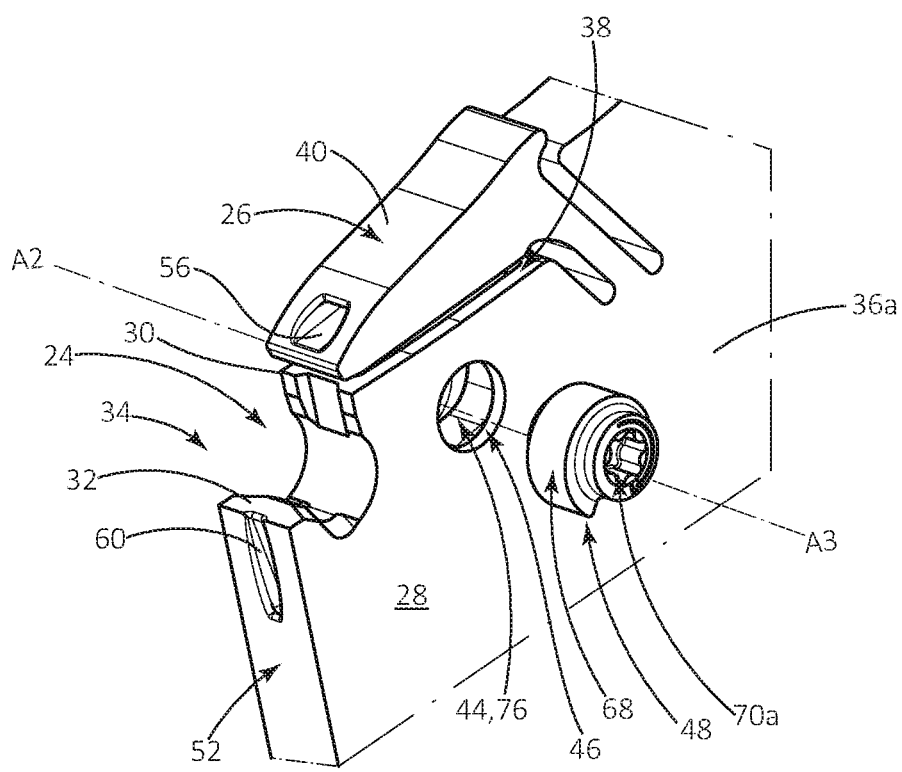
FIG. 2 is an exploded view of the tool holder shown in FIG. 1.

As shown in FIGS. 2, 6 and 7, an access bore 46 formed in the lower jaw 28 extends along a second axis A2, and a locking member 48 (also referred to as a 'lock 48') extending along a third axis A3 occupies the access bore 46 and engages the locking portion 44 of the actuating member 42 (actuator In some embodiments of the present invention, the clamping distance DC may be increased or decreased by rotation of the locking member 48 about its third axis A3.

Also, in some embodiments of the present invention, the upper jaw 26 may be resiliently displaced about the resilience axis of rotation AR by rotation of the locking member 48 about its third axis A3.

As shown in FIG. 4, a first plane P1 intersects the upper and lower pocket surfaces 30, 32. Also, as shown in FIG. 4, the first plane P1 passes in-between the first and second body side surfaces 36a, 36b.

In some embodiments of the present invention, the first plane P1 may be parallel to or contain the longitudinal axis AL.

Also, in some embodiments of the present invention, the resilience axis of rotation AR may be perpendicular to the first plane P1.

Further, in some embodiments of the present invention, the first axis A1 may be parallel to or contained in the first plane P1.

Yet further, in some embodiments of the present invention, the upper and lower pocket surfaces 30, 32 may exhibit mirror symmetry about the first plane P1.

It should be appreciated that FIG. 5 may be a cross-sectional view of the tool holder 20 taken in the first plane P1.

As shown in FIG. 5, the first and second axes A1, A2 may be contained in a second plane P2.

In some embodiments of the present invention, the second plane P2 may be perpendicular to the first plane P1.

In some embodiments of the present invention, the first plane P1 may contain both the longitudinal axis AL and the first axis A1, while the second and third axes A2, A3 may intersect the first plane P1. Also, the first axis A1 may be perpendicular to the longitudinal axis AL, with the longitudinal axis AL establishing the rearward-to-forward direction DR, DF and the first axis A1 establishing the upward-to-downward direction DU, DD.

Also, in some embodiments of the present invention, the second axis A2 may be perpendicular to the first plane P1.

It should be appreciated that FIG. 6 may be a cross-sectional view of the tool holder 20 taken in the second plane P2.

As shown in FIGS. 6 and 7, a third plane P3 containing the first axis A1 and perpendicular to the second axis A2 intersects the locking portion 44.

In some embodiments of the present invention, the locking portion 44 may exhibit mirror symmetry about the third plane P3.

Also, in some embodiments of the present invention, the actuating member 42 may exhibit mirror symmetry about the third plane P3.

As shown in FIGS. 3 and 4, the holder body 22 may have a top body surface 50 facing in the upward direction DU.

In some embodiments of the present invention, the first and second body side surfaces 36a, 36b may be spaced apart by the top body surface 50, and the first and second body side surfaces 36a, 36b may face in first and second lateral directions DL1, DL2, respectively, transverse to the upward and downward directions DU, DD.

Also, in some embodiments of the present invention, the top body surface 50 may be located rearward of the upper jaw 26.

Further, in some embodiments of the present invention, the top body surface 50 may be elongated and extend parallel to the longitudinal axis AL.

As shown in FIGS. 3 and 4, the top body surface 50 may define a fourth plane P4 perpendicular to the first plane P1.

In some embodiments of the present invention, no portion of the holder body 22 may traverse the fourth plane P4, or in other words, no portion of the holder body 22 may extend upward of the fourth plane P4.

As shown in FIG. 3, the lower jaw 28 may have a front jaw surface 52 facing in the forward direction DF.

In some embodiments of the present invention, the first and second body side surfaces 36a, 36b may be spaced apart by the front jaw surface 52.

As shown in FIG. 3, the front jaw surface 52 may define a fifth plane P5 perpendicular to the longitudinal axis AL.

In some embodiments of the present invention, no portion of the holder body 22 may traverse the fifth plane P5, or in other words, no portion of the holder body 22 may extend forward of the fifth plane P5.

As shown in FIGS. 3 and 4, the holder body 22 may have a bottom body surface 53 facing in the downward direction DD.

In some embodiments of the present invention, the first and second body side surfaces 36a, 36b may be spaced apart by the bottom body surface 53. Thus, in some embodiments, the first and second body side surfaces 36a, 36b may extend between the top and bottom body surfaces 50, 53.

Also, in some embodiments of the present invention, the bottom body surface 53 may be elongated and extend parallel to the longitudinal axis AL.

Further, in some embodiments of the present invention, the bottom jaw surface 43 may be disposed on the bottom body surface 53, and the bottom body surface 53 may intersect the front jaw surface 52.

As shown in FIGS. 3 and 4, the bottom body surface 53 may define a sixth plane P6 perpendicular to the first plane P1.

In some embodiments of the present invention, no portion of the holder body 22 may traverse the sixth plane P6, or in other words, no portion of the holder body 22 may extend downward of the sixth plane P6.

As shown in FIGS. 5 and 6, an upper coolant duct 54 may extend through the upper jaw 26, and the first axis A1 may intersect the upper coolant duct 54.

In some embodiments of the present invention, the upper coolant duct 54 may open out to an upper exit orifice 56 on the top jaw surface 40 adjacent the upper pocket surface 30.

For embodiments of the present invention in which the first axis A1 intersects the upper coolant duct 54, it should be appreciated that the actuating member 42 is advantageously configured such that the upper coolant duct 54 can be routed directly through the upper jaw 26 to the upper exit orifice 56 without spatial limitations associated with the positioning and/or assembly of the actuating member 42 therein.

As shown in FIGS. 5 and 6, a lower coolant duct 58 may extend through the lower jaw 28, and the first axis A1 may intersect the lower coolant duct 58.

In some embodiments of the present invention, the lower coolant duct 58 may open out to a lower exit orifice 60 on the front jaw surface 52 adjacent the lower pocket surface 32.

For embodiments of the present invention in which the first axis A1 intersects the lower coolant duct 58, it should be appreciated that the actuating member 42 is advantageously configured such that the lower coolant duct 58 can be routed directly through the lower jaw 26 to the lower exit orifice 60 without spatial limitations associated with the positioning and/or assembly of the actuating member 42 therein.

As shown in FIGS. 6 and 7, the actuating member 42 may occupy an actuation cavity 62 in the lower jaw 28, and the access bore 46 may communicate with the actuation cavity 62.

In some embodiments of the present invention, the actuation cavity 62 may extend downwardly from the lower slot surface 41.

Also, in some embodiments of the present invention, the actuation cavity 62 may include first and second cavity side walls 64a, 64b facing each other.

As shown in FIGS. 6 and 7, the first and second cavity side walls 64a, 64b may be located on opposite sides of the third plane P3.

In some embodiments of the present invention, the access bore 46 may intersect at least one of the first and second cavity side walls 64a, 64b.

As shown in FIGS. 6 and 7, the access bore 46 may be circular in cross-section, having an access bore surface 66 defining an access bore diameter DB.

In some embodiments of the present invention, the access bore 46 may intersect both of the first and second cavity side walls 64a, 64b.

For embodiments of the present invention in which the access bore 46 intersects both of the first and second cavity side walls 64a, 64b, the access bore 46 may be interrupted by the actuation cavity 62.

In some embodiments of the present invention, the third plane P3 may be parallel to or coincident with the first plane P1.

Also, in some embodiments of the present invention, the access bore 46 may intersect at least one of the first and second body side surfaces 36a, 36b.

Further, in some embodiments of the present invention, the access bore 46 may intersect both of the first and second body side surfaces 36a, 36b.

As shown in FIGS. 4, 6 and 7, the upper and lower jaws 26, 28 may exhibit mirror symmetry about the first plane P1.

For embodiments of the present invention in which the upper and lower jaws 26, 28 exhibit mirror symmetry about the first plane P1, the third plane P3 may be coincident with the first plane P1.

Also, for embodiments of the present invention in which the upper and lower jaws 26, 28 exhibit mirror symmetry about the first plane P1, the first plane P1 may contain the longitudinal axis AL.

Further, for embodiments of the present invention in which the upper and lower jaws 26, 28 exhibit mirror symmetry about the first plane P1, the first axis A1 may be contained in the first plane P1.

Yet further, for embodiments of the present invention in which the upper and lower jaws 26, 28 exhibit mirror symmetry about the first plane P1, the first and second body side surfaces 36a, 36b may be spaced apart by the front jaw surface 52, and the holder body 22 may be blade shaped.

As shown in FIGS. 6 and 7, the actuating member 42 may be spaced apart from the first and second cavity side walls 64a, 64b.

It should be appreciated that during rotation of the locking member 48 about its third axis A3, the actuating member 42 may be spaced apart from the first and second cavity side walls 64a, 64b.

It should be also appreciated that during rotation of the locking member 48 about its third axis A3, the actuating member 42 may be entirely spaced apart from the lower jaw 28, and thus make no contact therewith.

As shown in FIG. 6, the locking member 48 may be non-threadingly retained in the access bore 46.

In some embodiments of the present invention, during rotation of the locking member 48 about its third axis A3, no translational movement of the locking member 48 may occur along the access bore's second axis A2.

As shown in FIG. 6, the second axis A2 may be coincident with the third axis A3, and it should be appreciated that during rotation of the locking member 48 about its third axis A3, the second and third axes A2, A3 may remain coincident.

As shown in FIGS. 5, 6, 8 and 9, the locking member 48 may have a cam portion 68 and at least one swivel portion 70a, 70b disposed along its third axis A3.

As shown in FIG. 6, the at least one swivel portion 70a, 70b may occupy the access bore 46.

In some embodiments of the present invention, each of the at least one swivel portion 70a, 70b may be circular in cross-section, having a center coincident with the third axis A3 and a peripheral swivel surface 72a, 72b defining a swivel diameter DS.

Also, in some embodiments of the present invention, the swivel diameter DS may be less than the access bore diameter DB.

Further, in some embodiments of the present invention, each of the at least one swivel portion 70a, 70b may have a swivel socket 74, such as a Torx or hexagonal socket, for providing a means of receiving a socket wrench (not shown).

Yet further, in some embodiments of the present invention, the locking member 48 may have two swivel portions 70a, 70b spaced apart by the cam portion 68 along the third axis A3.

For embodiments of the present invention in which the access bore 46 intersects both of the first and second cavity side walls 64a, 64b and the locking member 48 has two swivel portions 70a, 70b, it should be appreciated the torque wrench may advantageously engage either one of the two swivel sockets 74 from either one of the first and second lateral directions DL1, DL2.

As shown in FIGS. 5 and 6, the actuating member's locking portion 44 may include an activation aperture 76, and the cam portion 68 may occupy the activation aperture 76.

In some embodiments of the present invention, the cam portion 68 may have a peripheral cam surface 78 which may be non-circular in cross-section.

Also, in some embodiments of the present invention, the activation aperture 76 may have an inner aperture surface 79.

Further, in some embodiments of the present invention, the activation aperture 76 may be non-circular in cross-section.

Figures 8, 9:
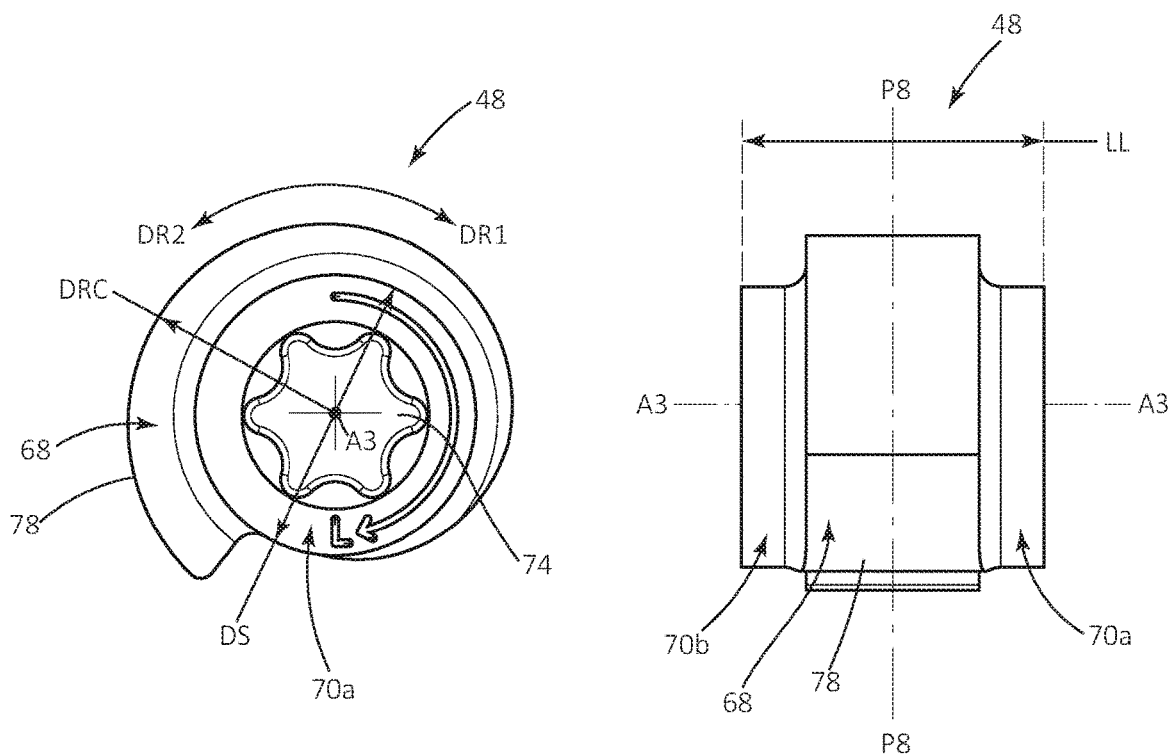
FIG. 8 is a side view of the tool holder's locking member.
FIG. 9 is an end view of the locking member shown in FIG. 8.

As shown in FIG. 9, at least a circumferential portion of the peripheral cam surface 78 may be located a continually decreasing radial cam distance DRC from the third axis A3 in a first rotational direction DR1.

In some embodiments of the present invention, the peripheral cam surface 78 may exhibit 1-fold rotational symmetry about the third axis A3. In other words, the peripheral cam surface 78 is rotationally symmetric only upon rotation by 360° or multiples thereof.

As shown in FIG. 5, by virtue of the peripheral cam surface 78 contacting a generally upward facing circumferential portion of the inner aperture surface 79, it should be appreciated that rotation of the locking member 48 in the first rotational direction DR1 about its third axis A3 may result in a downward force being applied to the actuating member 42 and a decrease of the clamping distance DC, and rotation of the locking member 48 in a second rotational direction DR2 opposite to the first rotational direction DR1 about its third axis A3, may result in the downward clamping force being released and an increase of the clamping distance DC due to the upper jaw's resilience.

For such embodiments of the invention, it should be appreciated that the insert receiving pocket 34 is 'normally open' and the downward force is a clamping force.

In other embodiments of the present invention (not shown), the peripheral cam surface 78 may contact a generally downward facing circumferential portion of the inner aperture surface 79, such that rotation of the locking member 48 in the first rotational direction DR1 about its third axis A3 may result in an upward force being applied to the actuating member 42 and an increase of the clamping distance DC, and rotation of the locking member 48 in the second rotational direction DR2, may result in the upward force being released and a decrease of the clamping distance DC due to the upper jaw's resilience.

For such embodiments of the invention, it should be appreciated that the insert receiving pocket 34 is 'normally closed' and the upward force is an unclamping force.

As shown in FIG. 7, in a cross-section taken in a seventh plane P7 perpendicular to the first axis A1 and intersecting the activation aperture 76, the locking portion 44 has a lateral width WLT perpendicular to the first plane P1 and a longitudinal width WLG parallel to the longitudinal axis AL.

Also, as shown in FIG. 7, in the cross-section taken in the seventh plane P7, the locking portion 44 may be oblong shaped.

In some embodiments of the present invention, the lateral width WLT may be less than half the longitudinal width WLG.

Also, in some embodiments of the present invention, the seventh plane P7 may contain the access bore's second axis A2.

As shown in FIGS. 6 and 8, an eighth plane P8 perpendicular to the third axis A3 intersects the cam portion 68.

In some embodiments of the present invention, the locking member 48 may exhibit mirror symmetry about the eighth plane P8.

Also, in some embodiments of the present invention, as shown in FIG. 6, the eighth plane P8 may be parallel to or coincident with the first plane P1.

For embodiments of the present invention in which the upper and lower jaws 26, 28 exhibit mirror symmetry about the first plane P1, the eighth plane P8 may be coincident with the first plane P1.

As shown in FIG. 9, in a view of the locking member 48 along the third axis A3, at least a circumferential portion of the peripheral cam surface 78 may be located radially outward of the peripheral swivel surface 72a, 72b.

In some embodiments of the present invention, at least a circumferential portion of the peripheral cam surface 78 may be located radially outward of the access bore surface 66.

For embodiments of the present invention in which the access bore 46 intersects both of the first and second cavity side walls 64a, 64b and at least a circumferential portion of the peripheral cam surface 78 is located radially outward of the access bore surface 66, it should be appreciated that the cam portion 68 may be captively retained in the activation aperture 76, and the at least one swivel portion 70a, 70b may be captively retained in the access bore 46.

Benefits of configuring the locking member 48 such that the cam portion 68 is captively retained in the activation aperture 76 and the at least one swivel portion 70a, 70b is captively retained in the access bore 46 include: avoidance of inadvertent falling parts.

In some embodiments of the present invention, the tool holder 20 may be produced by means of additive manufacturing, whereby the holder body 22 and the locking member 48 may be formed simultaneously during the additive manufacturing process.

Benefits of simultaneously producing the holder body 22 and the locking member 48 include: omission of assembly steps and reduction of manufacturing costs.

Figure 10:
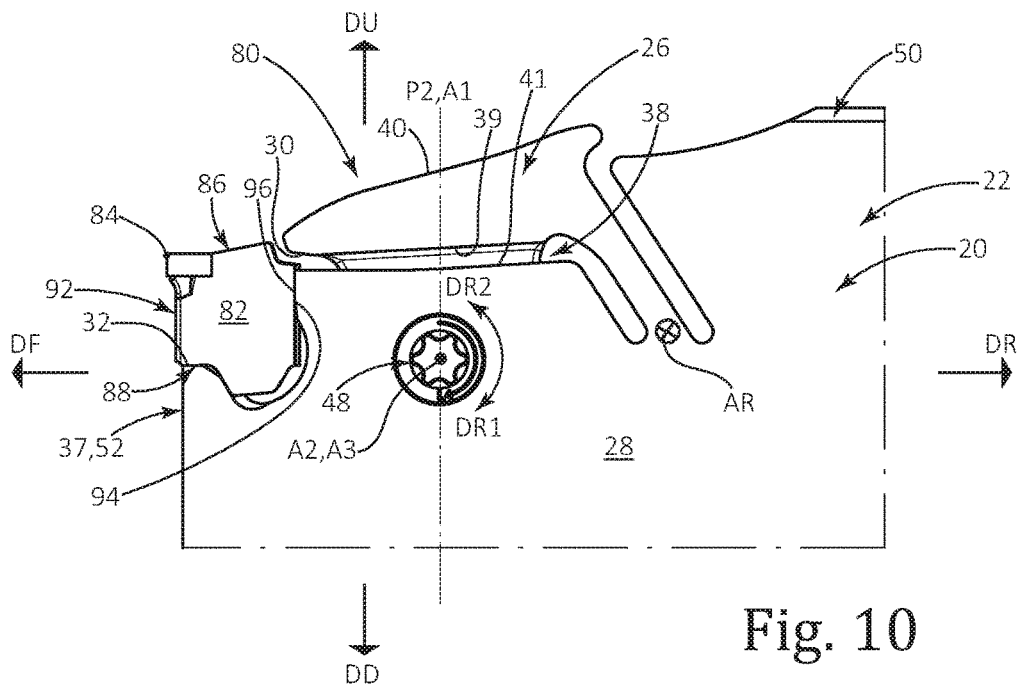
FIG. 10 is a side view of a cutting tool in accordance with some embodiments of the present invention.
Figure 11:
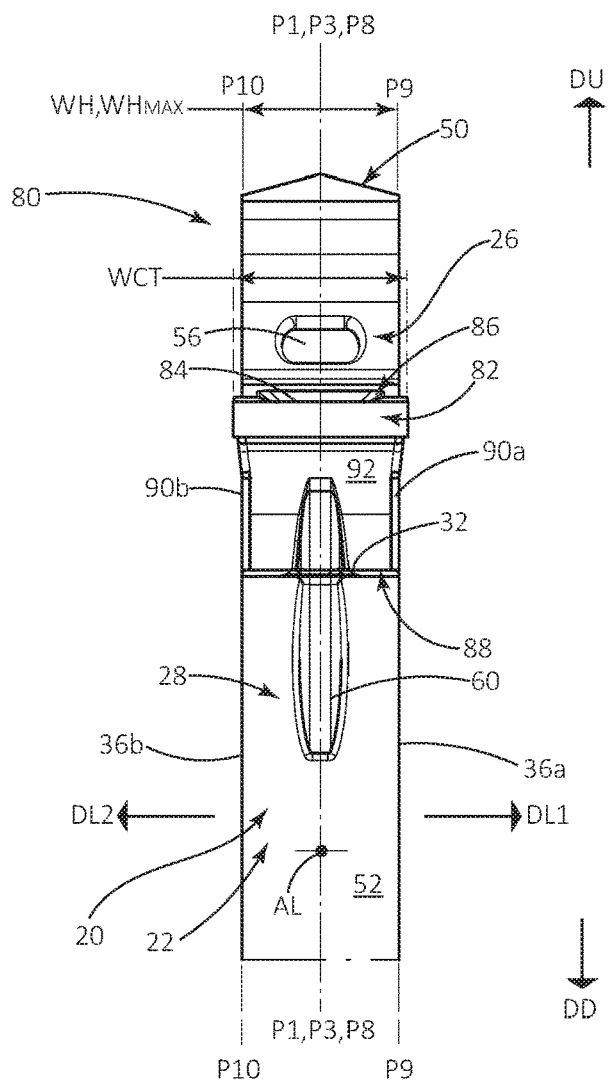
FIG. 11 is a front end view of the cutting tool shown in FIG. 10.

Attention is now drawn to FIGS. 10 and 11, showing a cutting tool 80 according to the present invention, comprising the tool holder 20 and a cutting insert 82 removably secured in the tool holder's insert receiving pocket 34, suitable for performing grooving and parting operations.

In some embodiments of the present invention, the cutting insert 82 may preferably be manufactured from cemented carbide.

For embodiments of the invention in which the upper and lower jaws 26, 28 do not exhibit mirror symmetry about the first plane P1 (not shown), it should be appreciated that by configuring the lateral width WLT to be less than half the longitudinal width WLG, the third and eighth planes P3, P8 along which the clamping force is applied can be located advantageously close to the first plane P1 such that the clamping force may be efficiently transmitted through the upper clamping jaw 26 to clamp the cutting insert 82 in the insert receiving pocket 34.

As shown in FIG. 11, ninth and tenth planes P9, P10 defined by the first and second body side surfaces 36a, 36b are spaced apart by a holder width WH perpendicular to the first plane P1, and the cutting insert 82 has at least one cutting edge 84 defining a cutting width WCT perpendicular to the first plane P1.

In some embodiments of the present invention, the cutting width WCT may be greater than the holder width WH.

As shown in FIG. 11, no portion of the holder body 22 may traverse the ninth and tenth planes P9, P10, or in other words, no portion of the holder body 22 may extend laterally beyond the ninth and tenth planes P9, P10.

For embodiments of the present invention in which no portion of the holder body 22 traverses the ninth and tenth planes P9, P10, it should be appreciated that the holder width WH defines a maximum holder width $WH_{MAX}$ of the holder body 22.

As shown in FIGS. 6 and 8, the locking member 48 has a locking length LL measured along its third axis A3.

In some embodiments of the present invention, the locking length LL is less than the holder width WH, and no portion of the locking member 48 may traverse the ninth and tenth planes P9, P10.

Also, for embodiments of the present invention in which no translational movement of the locking member 48 may occur along the access bore's second axis A2, it should be appreciated that no portion of the locking member 48 may traverse the ninth and tenth planes P9, P10 in any rotational position thereof.

For embodiments of the present invention in which the cutting width WCT is greater than the holder width WH and the locking length LL is less than the holder width WH, it should be appreciated that the holder body 22 may be blade shaped and the cutting depth of the cutting tool 80 may not be limited by the tool holder 20.

Figure 12:
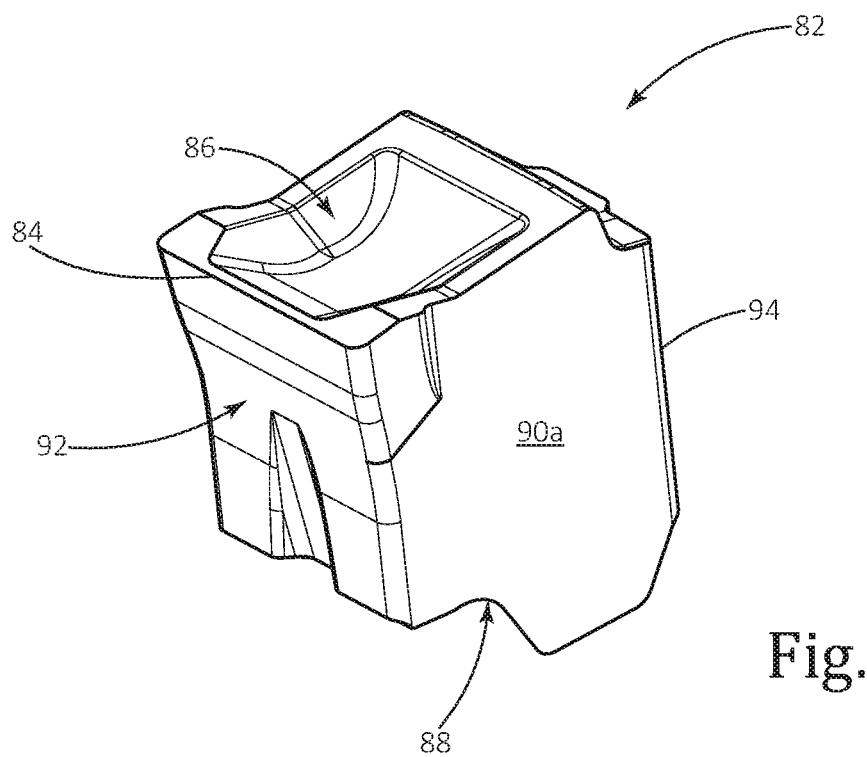
FIG. 12 is a perspective view of a cutting insert in accordance with some embodiments of the present invention.
Figure 13:
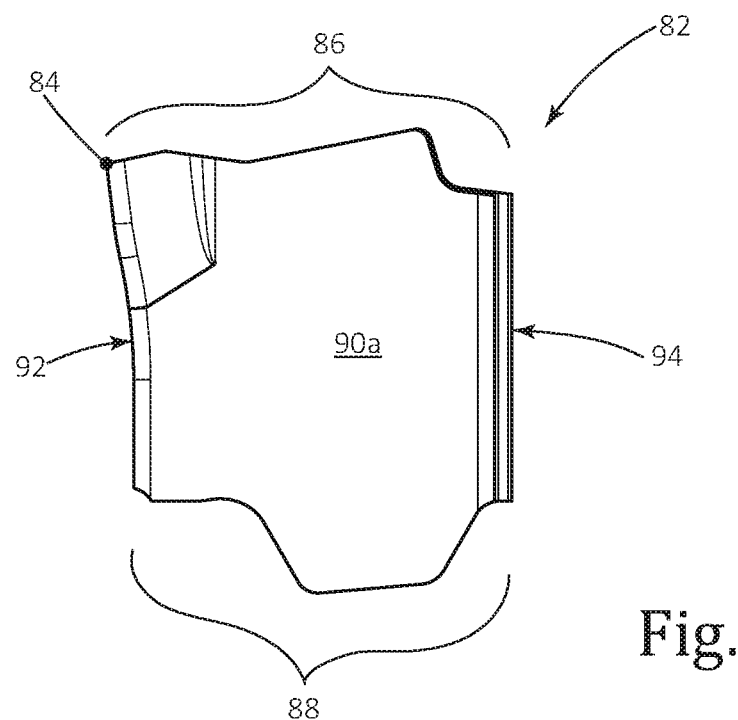
FIG. 13 is a side view of the cutting insert shown in FIG. 12.

As shown in FIGS. 12 and 13, the cutting insert 82 may have opposing upper and lower insert surfaces 86, 88 spaced apart by a pair of opposing first and second insert side surfaces 90a, 90b and a pair of opposing first and second insert end surfaces 92, 94.

In some embodiments of the present invention, the upper and lower insert surfaces 86, 88 may be non-identical.

Also, in some embodiments of the present invention, the first and second insert end surfaces 92, 94 may be non-identical.

Further, in some embodiments of the present invention, the at least one cutting edge 84 may be a single cutting edge formed at the intersection of the first insert end surface 92 and the upper insert surface 86.

As shown in FIG. 10, the upper and lower insert surfaces 86, 88 may be in clamping contact with the upper and lower pocket surfaces 30, 32, respectively, and the first insert end surface 92 may face in the forward direction DF.

Also, as shown in FIG. 10, the second insert end surface 94 may face in the rearward direction DR and abut a forward-facing stopper surface 96 disposed on the lower jaw 28.

For embodiments of the present invention in which an upper coolant duct 54 extends through the upper jaw 26 and opens out to an upper exit orifice 56 on the top jaw surface 40 adjacent the upper pocket surface 30, it should be appreciated that coolant fluid exiting the upper coolant duct 54 will be directed along the upper insert surface 86 in the forward direction DF towards the cutting edge 84.

For embodiments of the present invention in which a lower coolant duct 58 extends through the lower jaw 28 and opens out to a lower exit orifice 60 on the front jaw surface 52 adjacent the lower pocket surface 32, it should be appreciated that coolant fluid exiting the lower coolant duct 58 will be directed along the first insert end surface 92 (which faces in the forward direction DF) in the upward direction DU towards the cutting edge 84.

Figure 14:
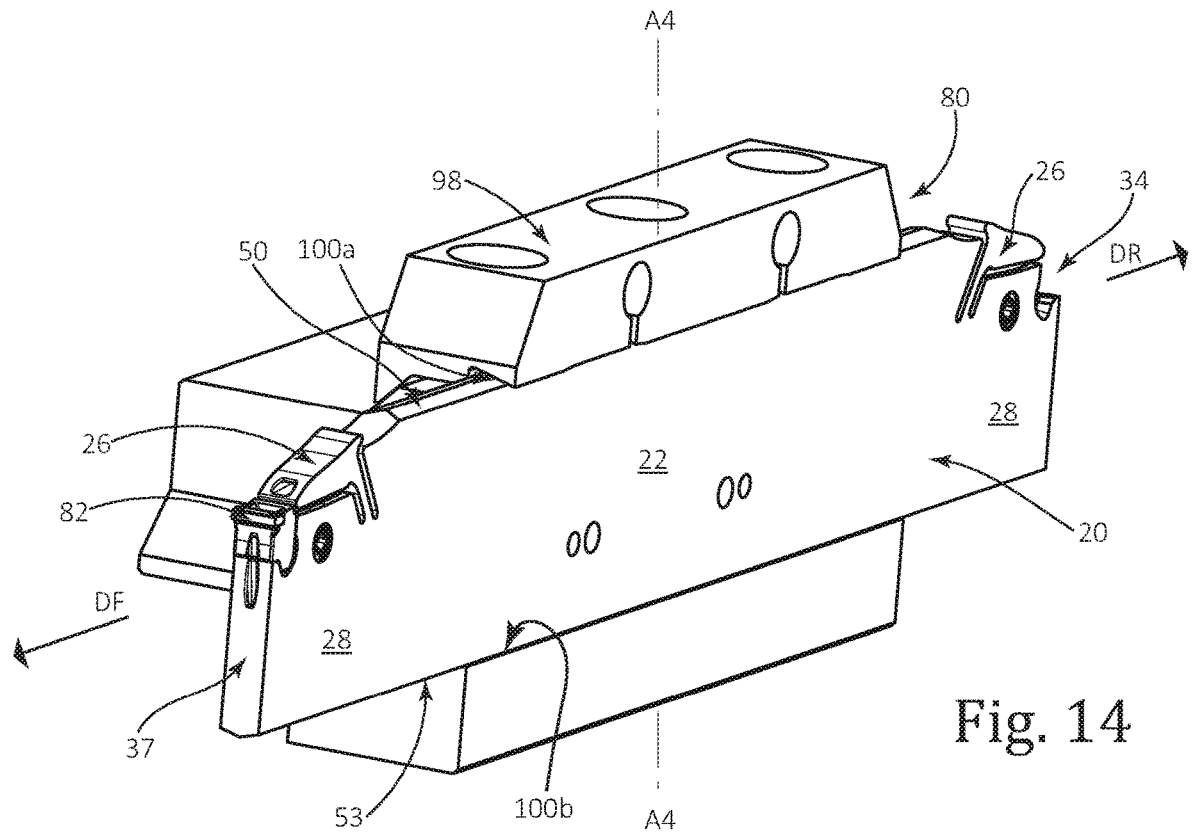
FIG. 14 is a perspective view of the cutting tool having two insert receiving pockets, retained in a tool block.

As shown in FIG. 14, the cutting tool 80 may be removably retained in an elongated tool block 98, and the top and bottom body surfaces 50, 53 may be in clamping contact with parallely extending top and bottom retaining grooves 100a, 100b of the tool block 98.

Figure 15:
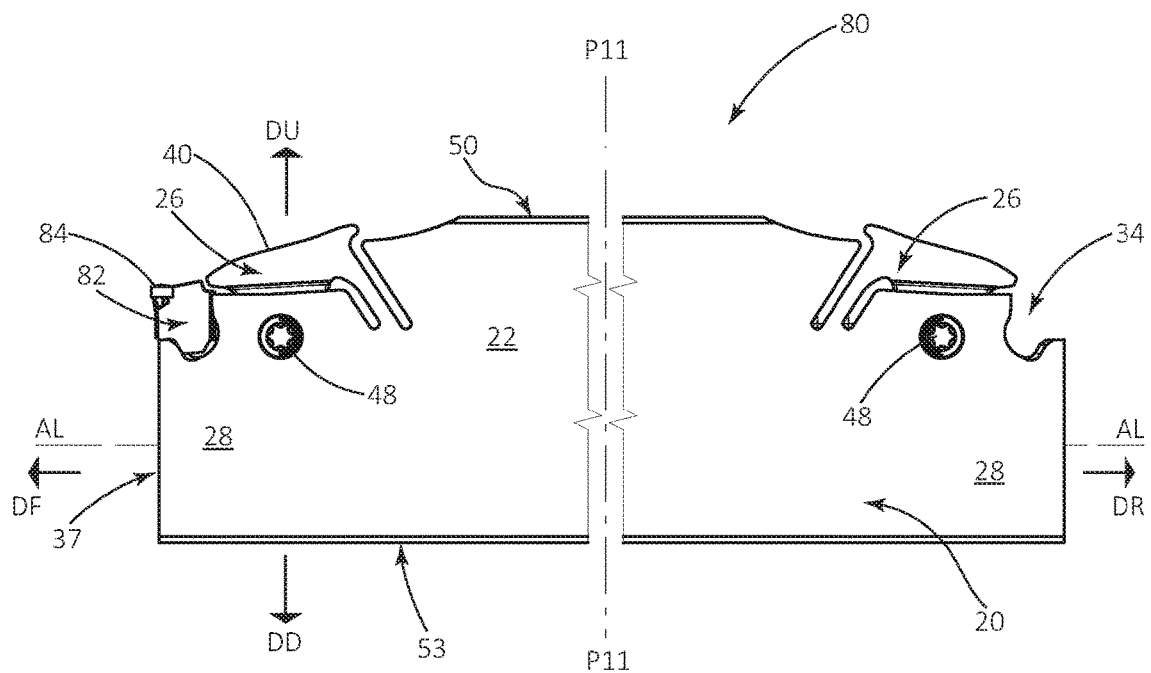
FIG. 15 is a side view of the cutting tool shown in FIG. 14.

As shown in FIG. 15, the holder body 22 may exhibit mirror symmetry about an eleventh plane P11 perpendicular to the first plane P1 and perpendicular to the longitudinal axis AL.

For such embodiments of the present invention, the holder body 22 has two identical insert receiving pockets 34, and the cutting tool 80 is indexable about a fourth axis A4 formed at the intersection of the first and eleventh planes P1, P11.

Also, for such embodiments of the present invention, only one of the two identical insert receiving pockets 34 may be occupied by an operative cutting insert 82.

For embodiments of the present invention in which the holder body 22 exhibits mirror symmetry about the eleventh plane P11, and in which no portion of the holder body 22 traverses the fourth and sixth planes P4, P6, it should be appreciated that the cutting tool 80 may be slidingly inserted into the tool block 98 with no obstruction or snagging from the upper jaw 26 located on the opposite side of the eleventh plane P11 from the insert receiving pocket 34 housing the operative cutting insert 82.

In other embodiments of the present invention (not shown), the holder body 22 may exhibit mirror symmetry about a plane perpendicular to the first plane P1 and containing the longitudinal axis AL.

For such embodiments of the present invention (not shown), it should be appreciated that the forward end 37 of the holder body 22 has two identical insert receiving pockets 34, and the cutting tool 80 is indexable about the longitudinal axis AL.

Also, for such embodiments of the present invention (not shown), it should be appreciated that the holder body 22 is not configured with a bottom jaw surface 43, and is alternatively configured with two opposing top body surfaces 50 facing away from each other.

Further, for such embodiments of the present invention (not shown), only one of the two identical insert receiving pockets 34 at the forward end 37 of the holder body 22 may be occupied by a cutting insert 82.

By configuring the cutting tool 80 with only one occupied insert receiving pocket 34 at the forward end 37 of the holder body 22, it should be appreciated that the cutting depth of the cutting tool 80 will not be unnecessarily limited by a non-operative cutting insert 82 occupying the other insert receiving pocket 34 at the forward end 37 of the holder body 22.

For embodiments of the present invention, in which the holder body 22 exhibits mirror symmetry about the eleventh plane P11 and a plane perpendicular to the first plane P1 and containing the longitudinal axis AL (not shown), it should be appreciated that the holder body 22 has a total of four identical insert receiving pockets 34.

For such embodiments of the present invention, it should be appreciated that the cutting tool 80 may have four index positions in the tool block 98, and in each index position, only one of the four identical insert receiving pockets 34 may be occupied.

For further embodiments of the present invention, as shown in FIGS. 16 and 17, in which the holder body 22 is disc-shaped, it should be appreciated that the cutting tool 80 may be a rotary cutting tool, suitable for slotting operations, and configured with a plurality of cutting inserts 82 removably secured to a plurality of insert receiving pockets 34 circumferentially spaced about the holder body's periphery.

Although the present invention has been described to a certain degree of particularity, it should be understood that various alterations and modifications could be made without departing from the scope of the invention as hereinafter claimed.

What is claimed is:

1. A tool holder (20), comprising:
a holder body (22) having a longitudinal axis (AL) defining a rearward-to-forward direction (DR, DF), opposing first and second body side surfaces (36a, 36b) facing away from each other, and top and bottom body surfaces (50, 53) between which the first and second body side surfaces (36a, 36b) extend,
the holder body (22) further having opposing upper and lower jaws (26, 28) respectively defining upper and lower pocket surfaces (30, 32) of an insert receiving pocket (34), one of the upper and lower jaws (26, 28) being resiliently displaceable with respect to the other,
a resilience slot (38) extending away from the insert receiving pocket (34) and further separating the upper and lower jaws (26, 28), the resilience slot (38) having opposing upper and lower slot surfaces (39, 41) disposed on the upper and lower jaws (26, 28), respectively, the upper slot surface (39) facing in a downward direction (DD) and the lower slot surface (41) facing in an upward direction (DU) opposite to the downward direction (DD), and
a first plane (P1) passing mid-way in-between the body side surfaces (36a, 36b), intersecting the top and bottom body surfaces (50, 53), and intersecting the upper and lower pocket surfaces (30, 32),
wherein:
an actuator (42) located behind the insert receiving pocket (34) in the rearward direction (DR) and intersected by the first plane (P1) extends from the upper jaw (26) along the first axis (A1) in the downward direction (DD) and traverses the resilience slot (38), the actuator (42) comprising an activation aperture (76),
an access bore (46) formed in the lower jaw (28) extends along a second axis (A2),
a lock (48) extending along and rotatable about a third axis (A3) occupies the access bore (46) and engages the activation aperture (76),
the upper jaw (26) and the actuator (42) are integrally formed having unitary one-piece construction,
the upper jaw (26) has a top jaw surface (40) facing in the upward direction (DU), and
the first axis (A1) intersects the top jaw surface (40).

2. The tool holder (20) according to claim 1, wherein:
the upper and lower pocket surfaces (30, 32) are spaced apart by a clamping distance (DC), and
the clamping distance (DC) is increased or decreased by rotation of the lock (48) about its third axis (A3).

3. The tool holder (20) according to claim 2, wherein:
during rotation of the lock (48) about its third axis (A3), no translational movement of the lock (48) occurs along the access bore's second axis (A2).

4. The tool holder (20) according to claim 1, wherein:
the lock (48) has a cam portion (68) and at least one swivel portion (70a, 70b) disposed along its third axis (A3), and
the at least one swivel portion (70a, 70b) occupies the access bore (46).

5. The tool holder (20) according to claim 4, wherein:
the cam portion (68) occupies the activation aperture (76).

6. The tool holder (20) according to claim 4, wherein:
the cam portion (68) has a peripheral cam surface (78) which is non-circular in cross-section, and
at least a circumferential portion of the peripheral cam surface (78) is located a continually decreasing radial cam distance (DRC) from the third axis (A3) in a first rotational direction (DR1).

7. The tool holder (20) according to claim 1, wherein:
the actuator (42) occupies an actuation cavity (62) in the lower jaw (28), and
the access bore (46) communicates with the actuation cavity (62).

8. The tool holder (20) according to claim 7, wherein:
the actuation cavity (62) includes first and second cavity side walls (64a, 64b) facing each other, and
the access bore (46) intersects at least one of the first and second cavity side walls (64a, 64b).

9. The tool holder (20) according to claim 1, wherein:
the upper and lower jaws (26, 28) are integrally formed, having unitary one-piece construction.

10. The tool holder (20) according to claim 1, wherein:
the access bore (46) intersects at least one of the first and second body side surfaces (36a, 36b).

11. The tool holder (20) according to claim 10, wherein:
the longitudinal axis (AL) is perpendicular to the first axis (A1);
the insert receiving pocket (34) is located at a forward end (37) of the holder body (22); and
the first plane (P1) contains both the longitudinal axis (AL) and the first axis (A1).

12. The tool holder (20) according to claim 1, wherein:
the upper and lower pocket surfaces (30, 32) exhibit mirror symmetry about the first plane (P1).

13. The tool holder (20) according to claim 1, wherein:
the second axis (A2) is perpendicular to the first plane (P1).

14. The tool holder (20) according to claim 1, wherein:
an upper coolant duct (54) extends through the upper jaw (26), and
the first axis (A1) intersects the upper coolant duct (54).

15. The tool holder (20) according to claim 14, wherein:
the upper coolant duct (54) opens out to an upper exit orifice (56) on the top jaw surface (40) adjacent the upper pocket surface (30).

16. The tool holder (20) according to claim 1, wherein:
a lower coolant duct (58) extends through the lower jaw (28), and the first axis (A1) intersects the lower coolant duct (58).

17. The tool holder (20) according to claim 16, wherein:
the lower jaw (28) has a front jaw surface (52),
the lower coolant duct (58) opens out to a lower exit orifice (60) on the front jaw surface (52) adjacent the lower pocket surface (32).

18. The tool holder (20) according to claim 1, wherein:
the upper and lower jaws (26, 28) exhibit mirror symmetry about the first plane (P1).

19. A cutting tool (80) comprising a tool holder (20) according to claim 1, and a cutting insert (82) removably secured in the tool holder's insert receiving pocket (34).

20. The cutting tool (80) according to claim 19, wherein:
the holder body (22) includes opposing first and second body side surfaces (36a, 36b) facing away from each other,
ninth and tenth planes (P9, P10) defined by the first and second body side surfaces (36a, 36b) are spaced apart by a holder width (WH) perpendicular to the first plane (P1), and
the cutting insert (82) has at least one cutting edge (84) defining a cutting width (WCT) perpendicular to the first plane (P1),
wherein:
the cutting width (WCT) is greater than the holder width (WH).

21. The cutting tool (80) according to claim 20, wherein:
no portion of the holder body (22) traverses the ninth and tenth planes (P9, P10).

22. The tool holder (20) according to claim 1, wherein:
the upper jaw (26) has a resilience axis of rotation (AR) passing through the holder body (22) rearward of the resilience slot (38).

23. The tool holder (20) according to claim 1, wherein:
the resilience slot (38) communicates with the insert receiving pocket (34).

24. The tool holder (20) according to claim 1, wherein:
the lock (48) is non-threadingly retained in the access bore (46).

25. The tool holder (20) according to claim 2, wherein:
the actuator (42) remains entirely spaced apart from lower jaw (28) and makes no contact therewith, even when the lock (48) is rotated about its third axis A3.

26. A tool holder (20), comprising:
a holder body (22) extending in a rearward-to-forward direction (DR, DF) along a longitudinal axis (AL), the holder body (22) having:
   top and bottom body surfaces (50, 53), and first and second body side surfaces (36a, 36b) extending between the top and bottom body surfaces (50, 53);
   an insert receiving pocket (34) located at a forward end (37) of the holder body (22), the insert receiving pocket (34) defined by opposing upper and lower jaws (26, 28), the upper jaw having a top jaw surface (40), one of the upper and lower jaws (26, 28) being resiliently displaceable with respect to the other;
   a resilience slot (38) communicating with and extending away from the insert receiving pocket (34) in the rearward direction (DR) and further separating the upper and lower jaws (26, 28):
   upper and lower pocket surfaces (30, 32) defined on the upper and lower jaws (26, 28), respectively;
   a first plane (P1) containing the longitudinal axis (AL), passing in-between the first and second body side surfaces (36a, 36b) and intersecting the top and bottom body surfaces (50, 53) and also the upper and lower pocket surfaces (30, 32);
   a first axis (A1) contained in the first plane (P1) and perpendicular to the longitudinal axis (AL), the first axis (A1) extending in an upward-to-downward direction (DU, DD) transverse to the longitudinal axis (AL) and intersecting the top jaw surface (40);
   an actuator (42) extending from the upper jaw (26) along the first axis (A1) in the downward direction (DD) and traversing the resilience slot (38), the upper jaw (26) and the actuator (42) being integrally formed having unitary one-piece construction, the actuator (42) having an activation aperture (76); and
   an access bore (46) formed in the lower jaw (28) and extending along a second axis (A2) which intersects the first plane (P1); and
a lock (48) extending along a third axis (A3) which intersects the first plane (P1), the lock (48) occupying the access bore (46) and engaging the actuator (42);
wherein:
in a plane perpendicular to the first axis (A1) and also perpendicular to the first plane (P1), the actuator (42) has an oblong shape, with a lateral width (WLT) perpendicular the first plane (P1) and a longitudinal width (WLG) parallel to the longitudinal axis (AL), the lateral width (WLT) being less than half the longitudinal width (WLG).

27. The tool holder (20) according to claim 26, wherein:
the first plane (P1) intersects the actuator (42), in addition to the upper and lower pocket surfaces (30, 32).

28. The tool holder (20) according to claim 26, wherein:
said plane perpendicular to the first axis (A1) and also perpendicular to the first plane (P1), intersects the activation aperture (76).

29. A tool holder (20), comprising:
a holder body (22) extending in a rearward-to-forward direction (DR, DF) along a longitudinal axis (AL), the holder body (22) having opposing upper and lower jaws (26, 28) respectively defining upper and lower pocket surfaces (30, 32) of an insert receiving pocket (34), one of the upper and lower jaws (26, 28) being resiliently displaceable with respect to the other,
a resilience slot (38) communicating with and extending away from the insert receiving pocket (34) and further separating the upper and lower jaws (26, 28), the resilience slot (38) having opposing upper and lower slot surfaces (39, 41) disposed on the upper and lower jaws (26, 28), respectively, the upper slot surface (39) facing in a downward direction (DD) and the lower slot surface (41) facing in an upward direction (DU) opposite to the downward direction (DD), and
a first plane (P1) containing the longitudinal axis (AL), and intersecting the upper and lower pocket surfaces (30, 32),
wherein:
an actuator (42) extends from the upper jaw (26) along a first axis (A1) in the downward direction (DD) and traverses the resilience slot (38), the actuator (42) comprising an activation aperture (76),
an access bore (46) formed in the lower jaw (28) extends along a second axis (A2), and
a lock (48) extending along and rotatable about a third axis (A3) non-threadingly occupies the access bore (46) and engages the activation aperture (76),
and wherein:
the upper jaw (26) has a top jaw surface (40) facing in the upward direction (DU),
the first axis (A1) intersects the top jaw surface (40);
the upper and lower pocket surfaces (30, 32) are spaced apart by a clamping distance (DC),
the clamping distance (DC) is increased or decreased by rotation of the lock (48) about its third axis (A3), and
during rotation of the lock (48) about its third axis (A3), the actuator (42) is entirely spaced apart from the lower jaw (28) and makes no contact therewith.

30. The tool holder (20) according to claim 29, wherein:
the first plane (P1) intersects the actuator (42), in addition to the upper and lower pocket surfaces (30, 32).

* * * * *